Oct. 21, 1930.  W. W. TRINKS ET AL  1,778,777
LAUNDERING MACHINE
Filed Nov. 21, 1921  14 Sheets-Sheet 4

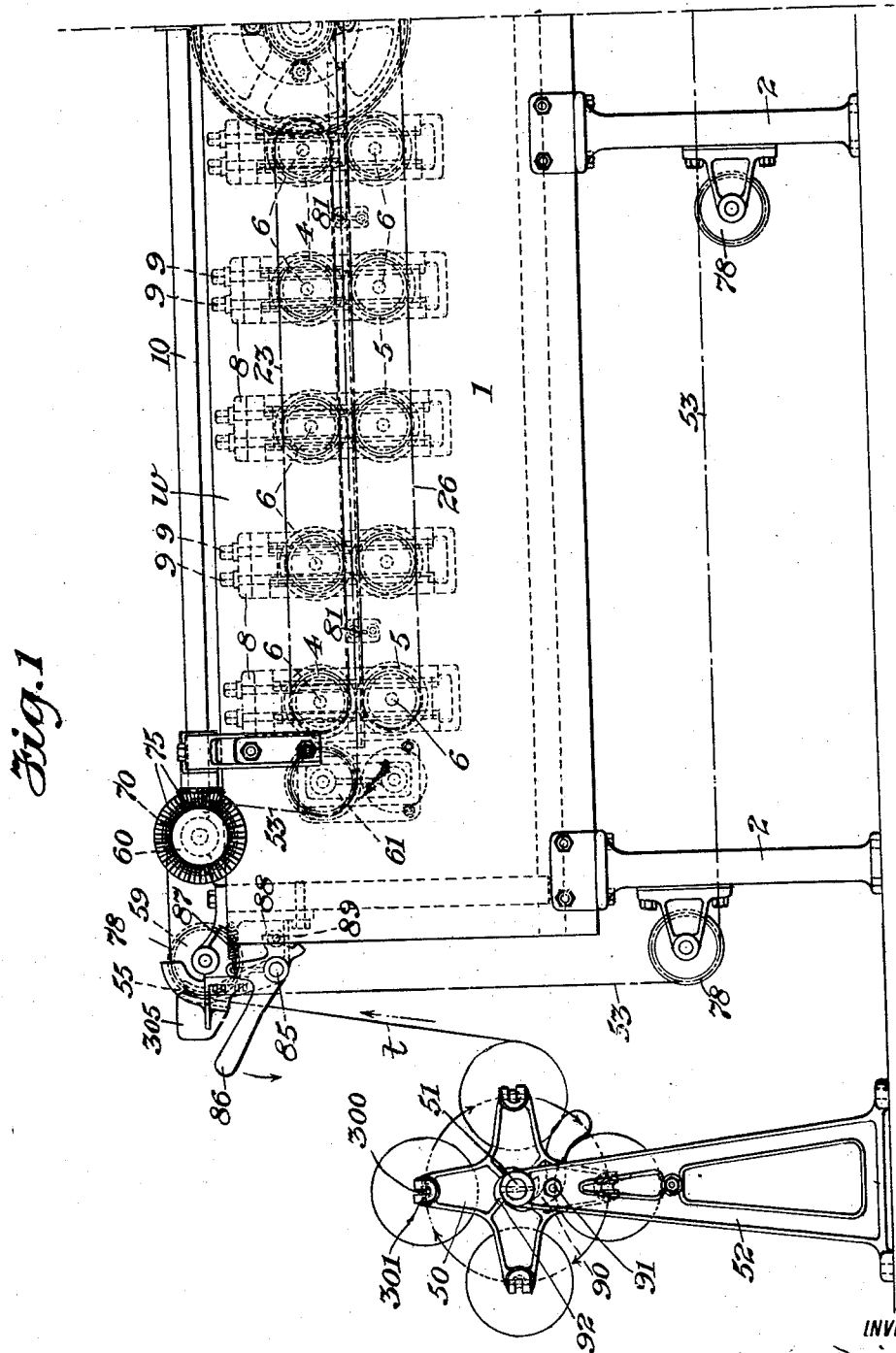

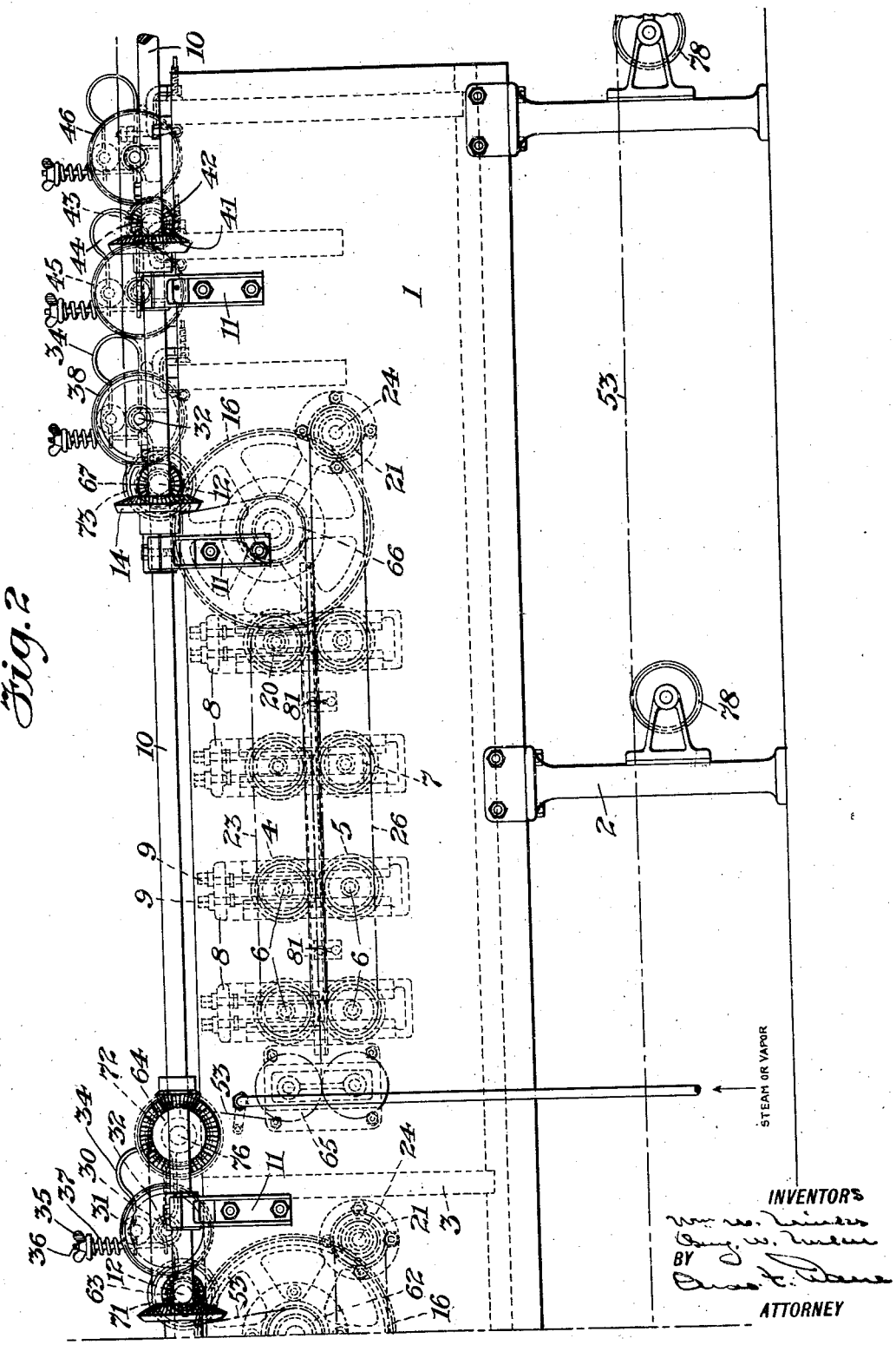

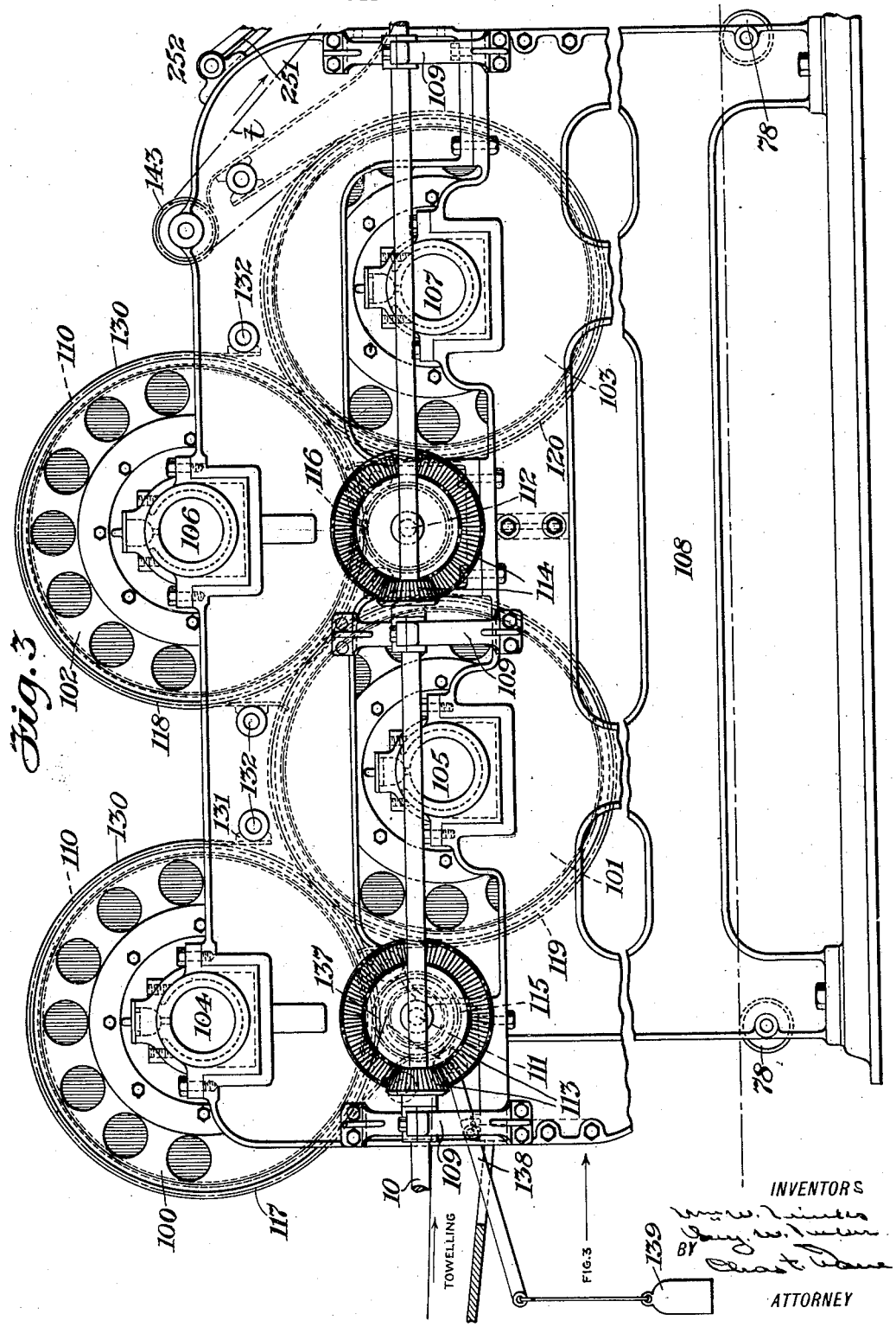

INVENTOR
ATTORNEY

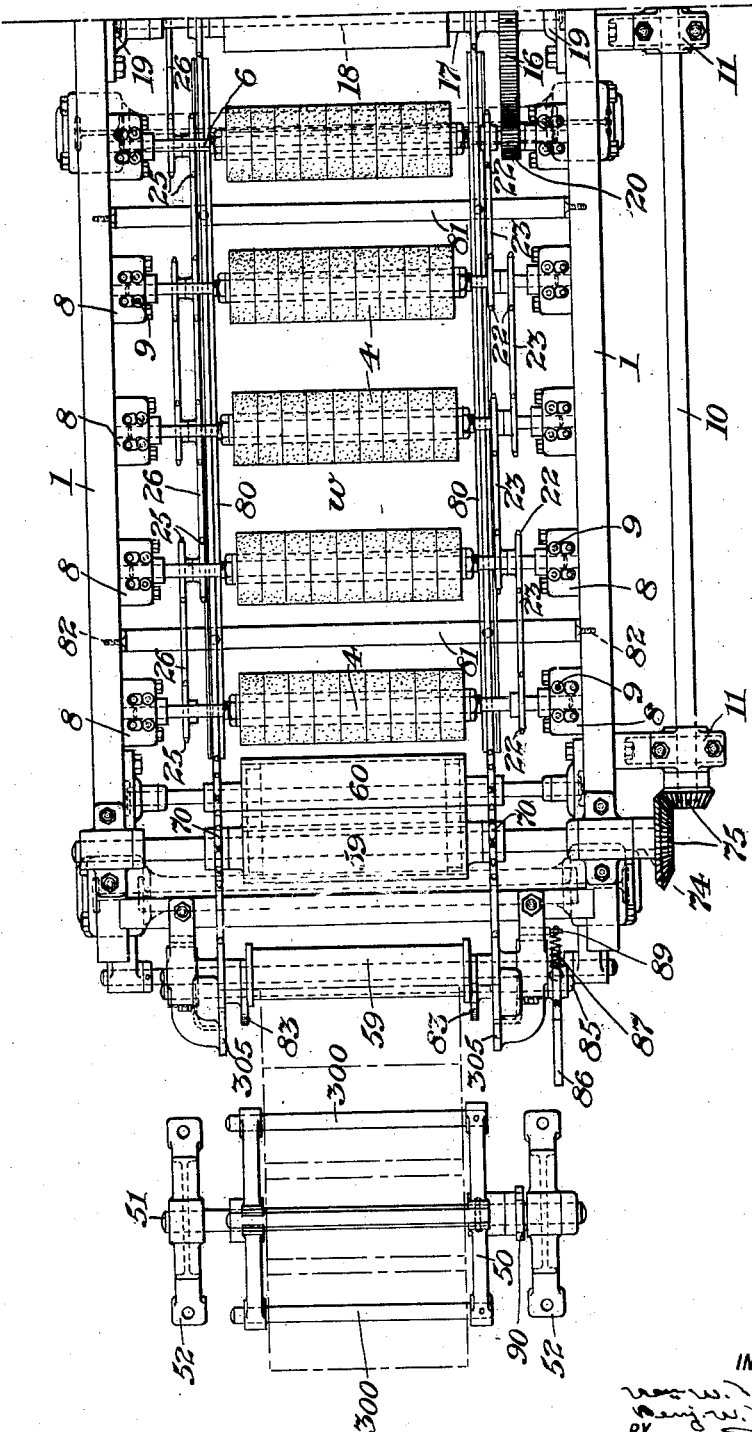

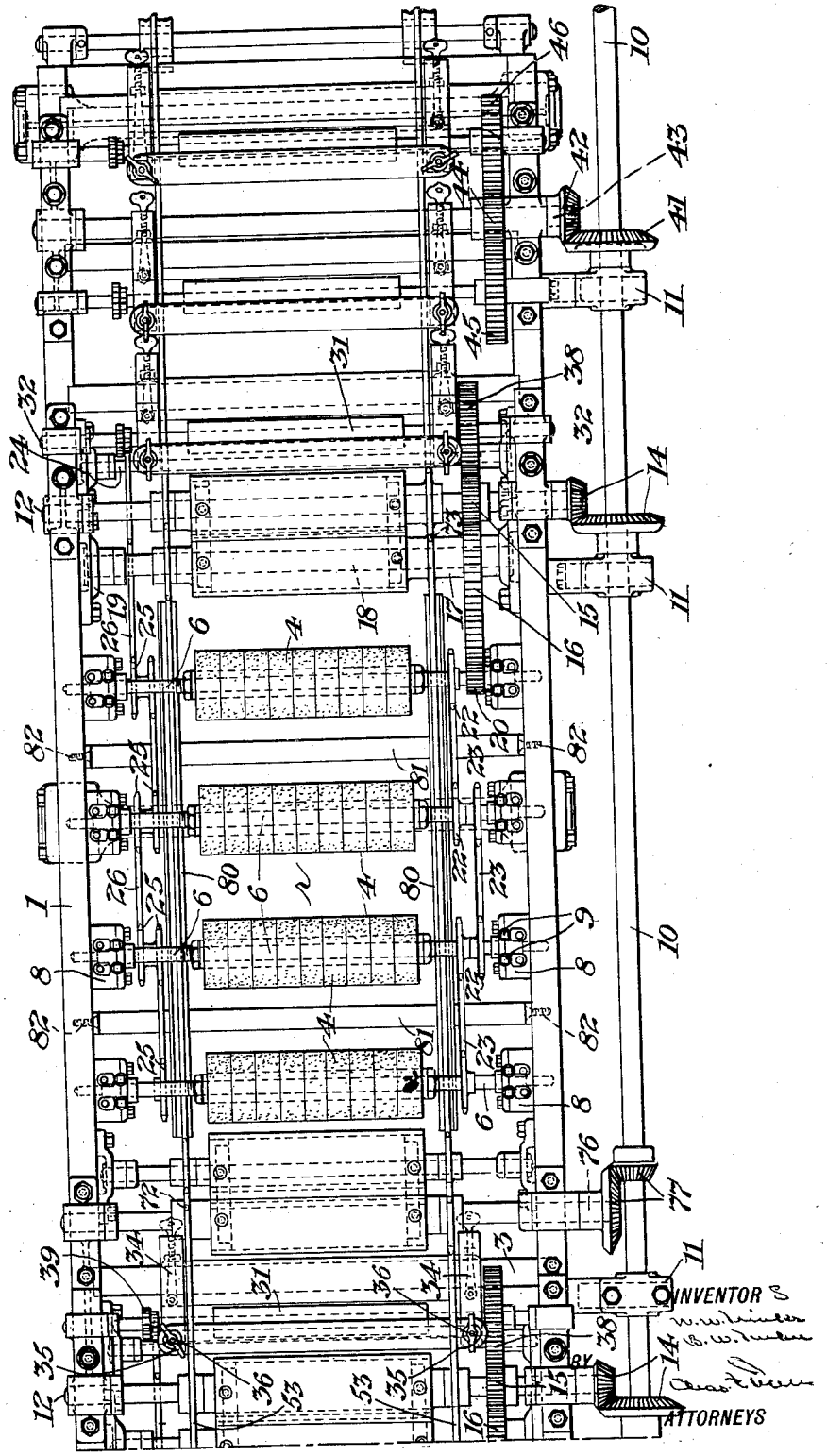

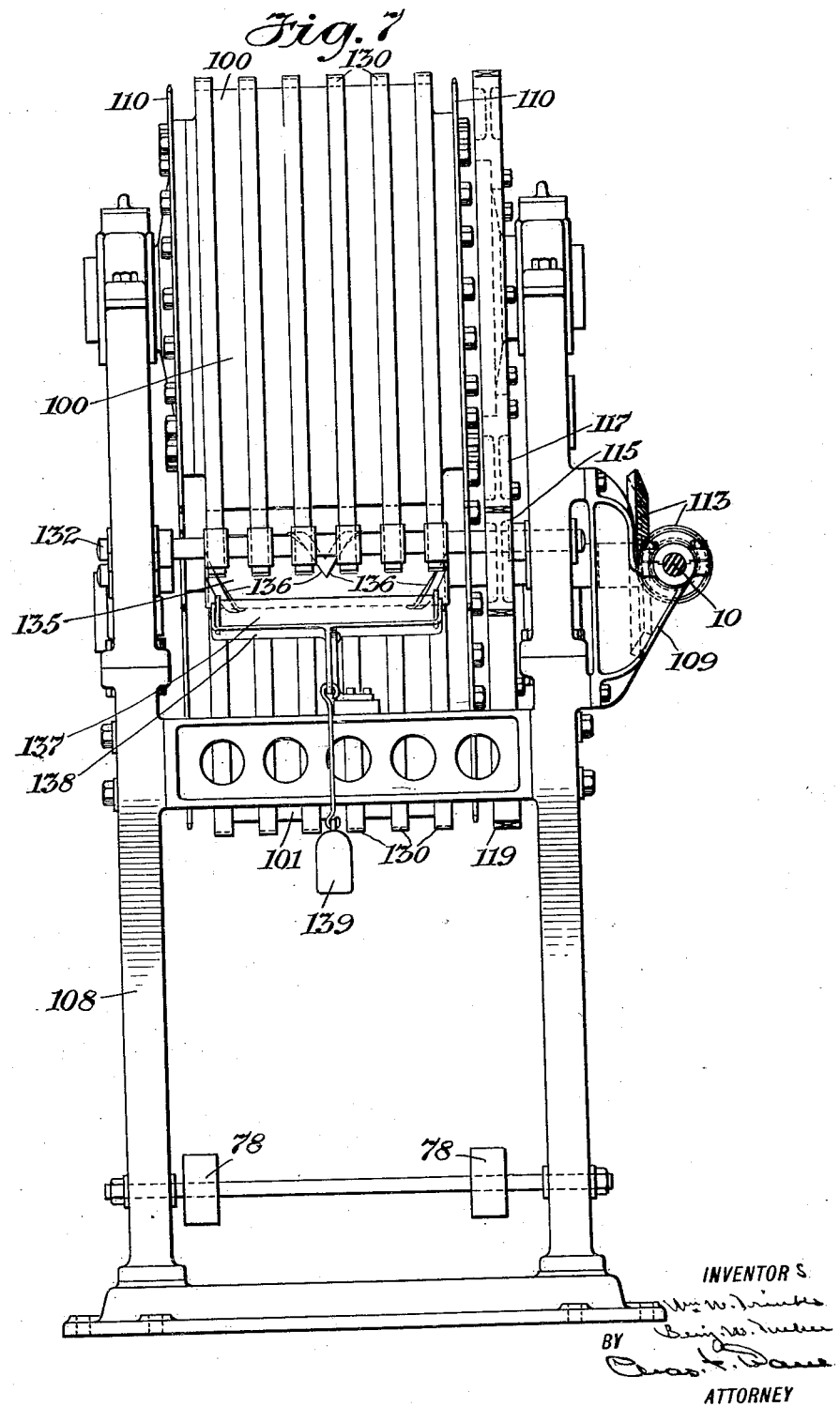

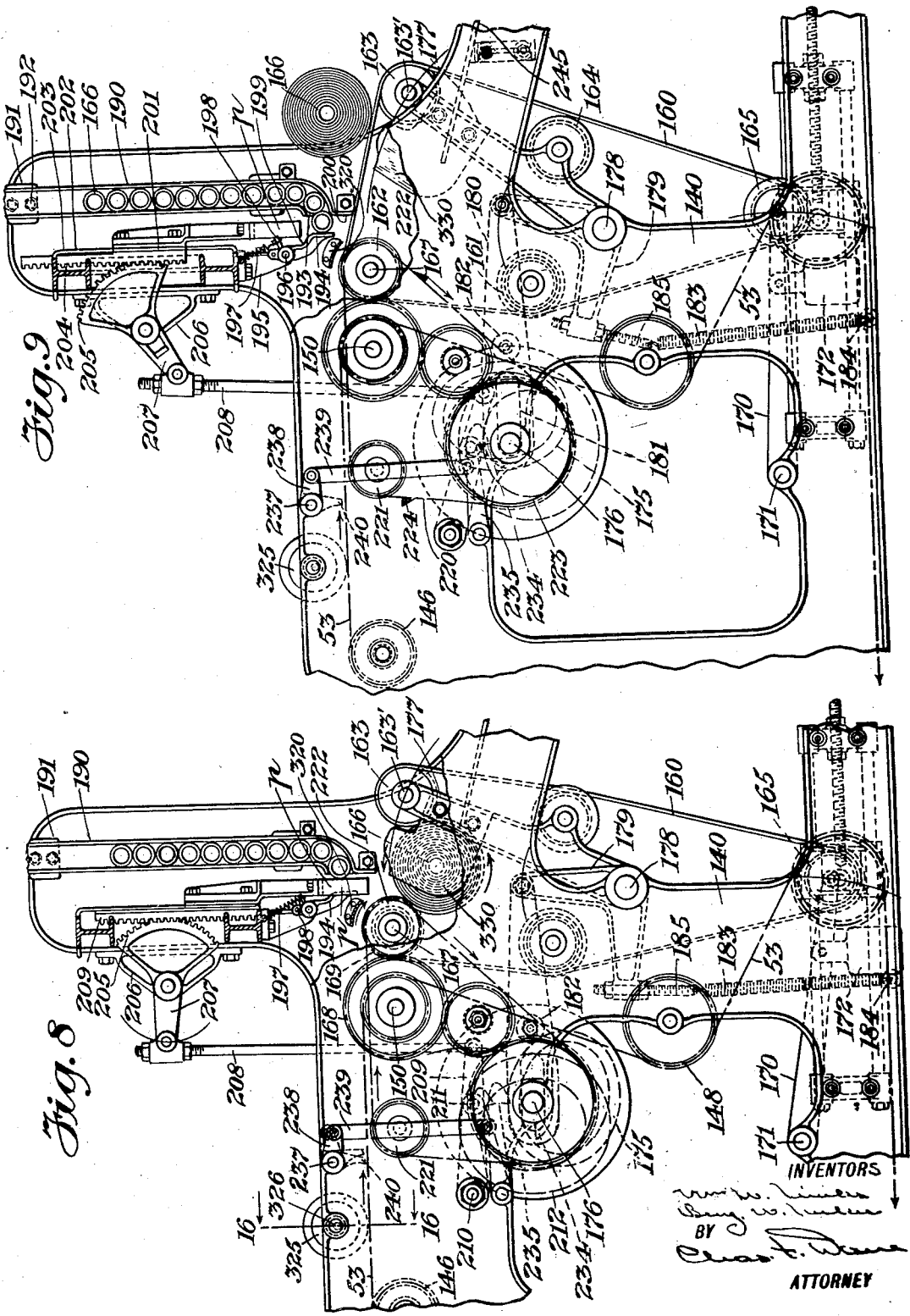

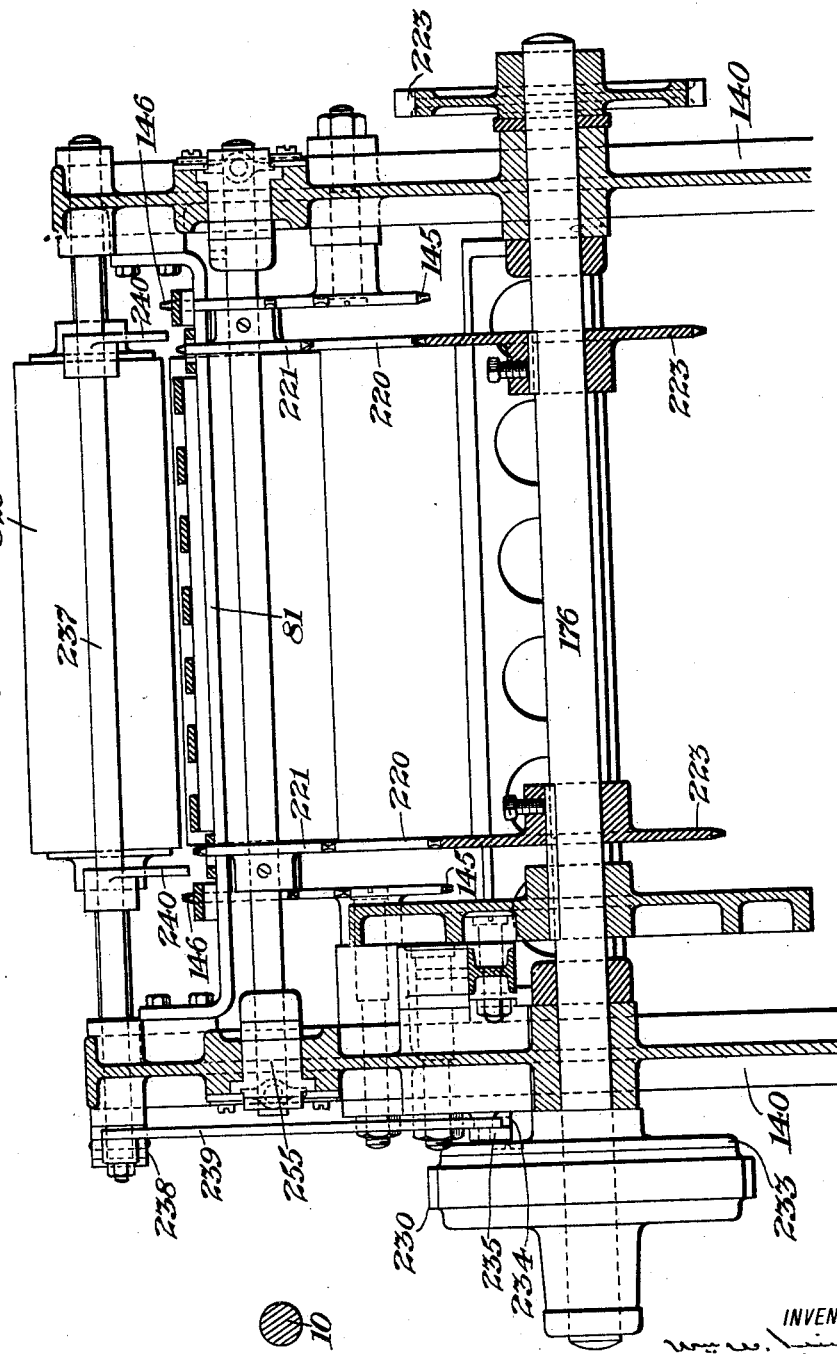

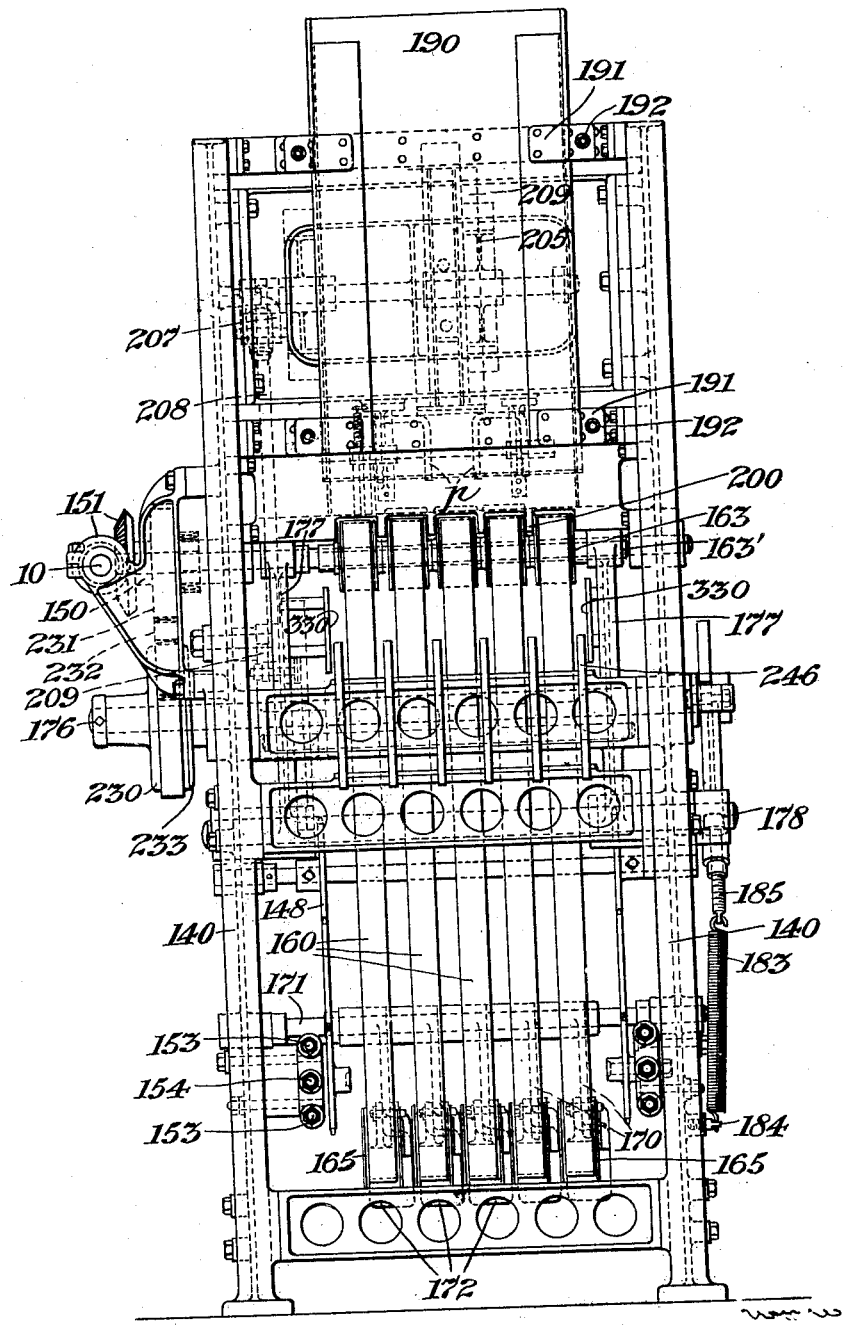

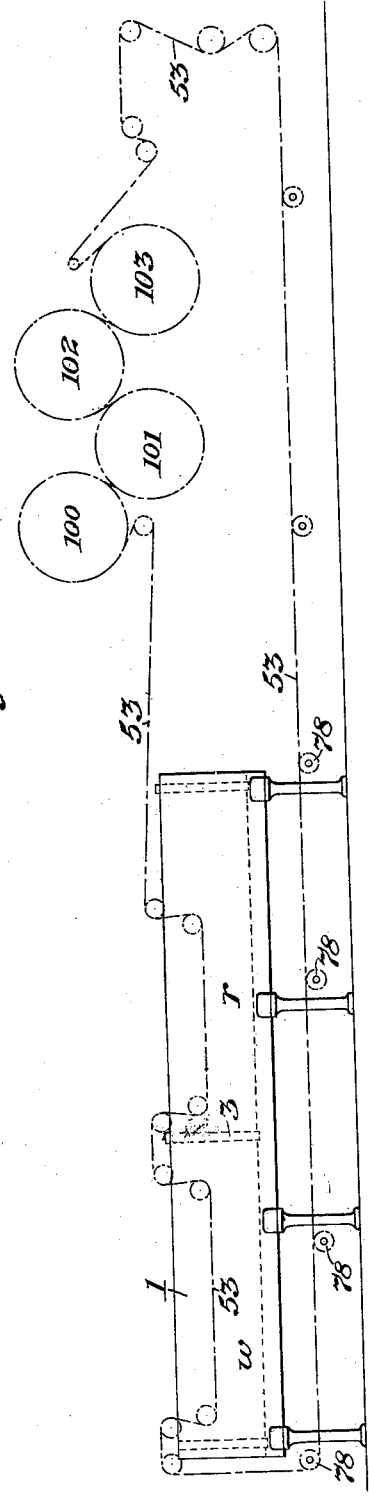
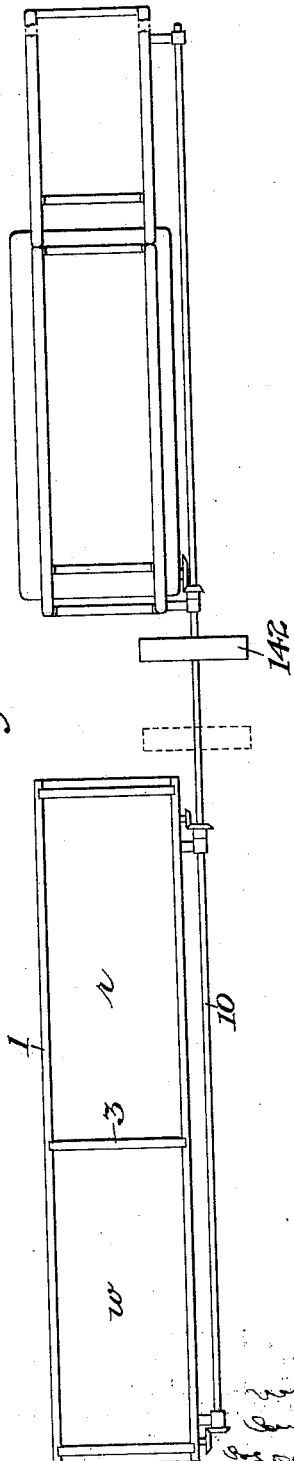

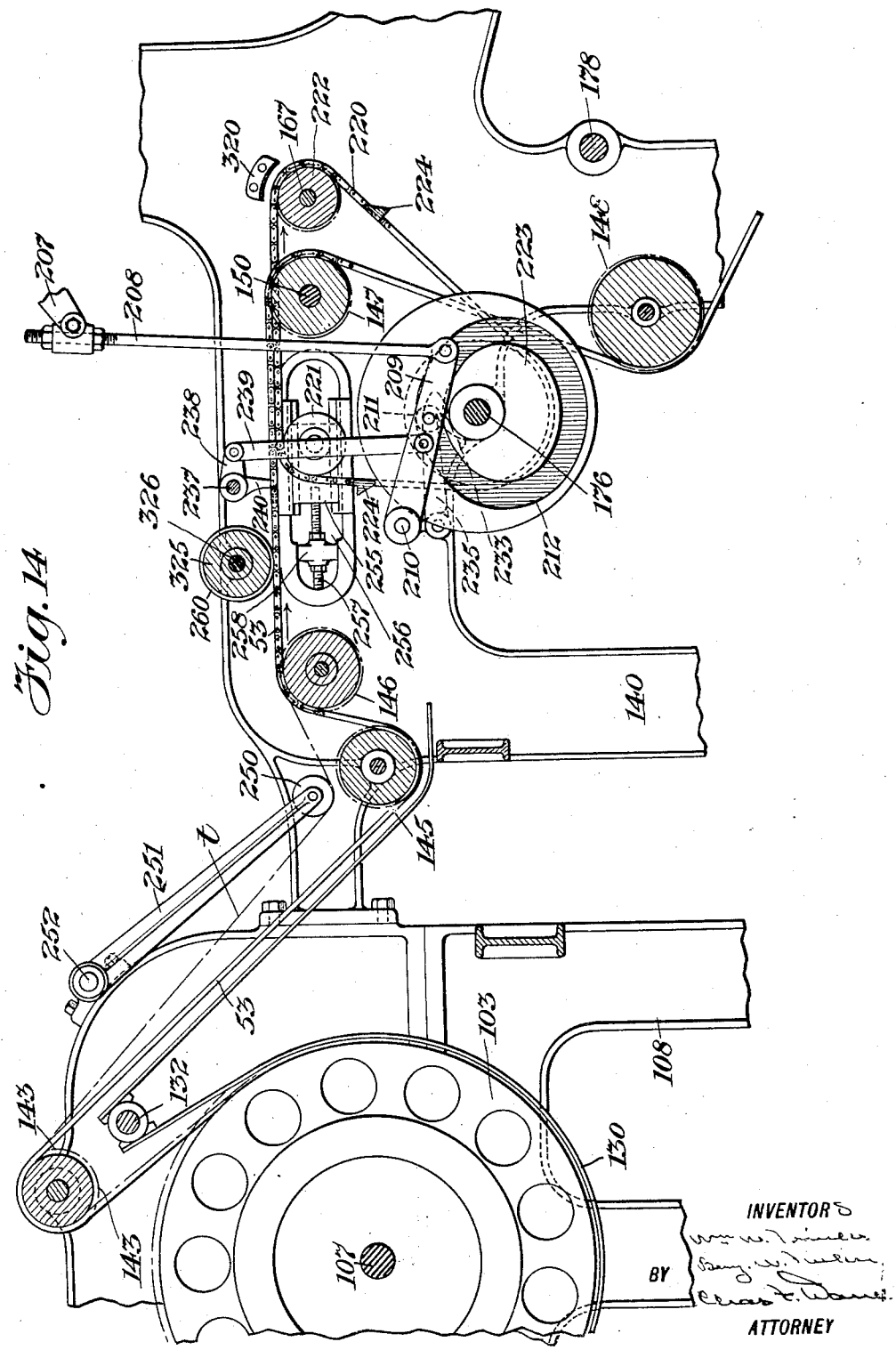

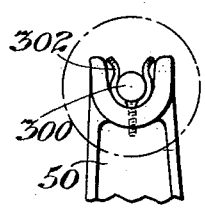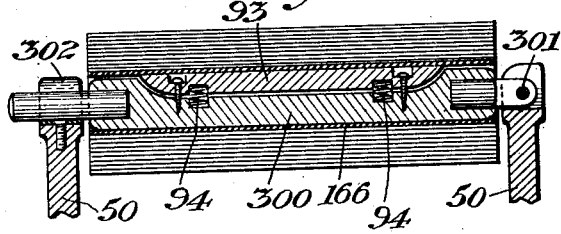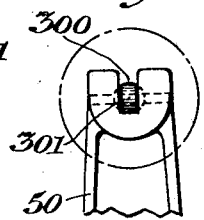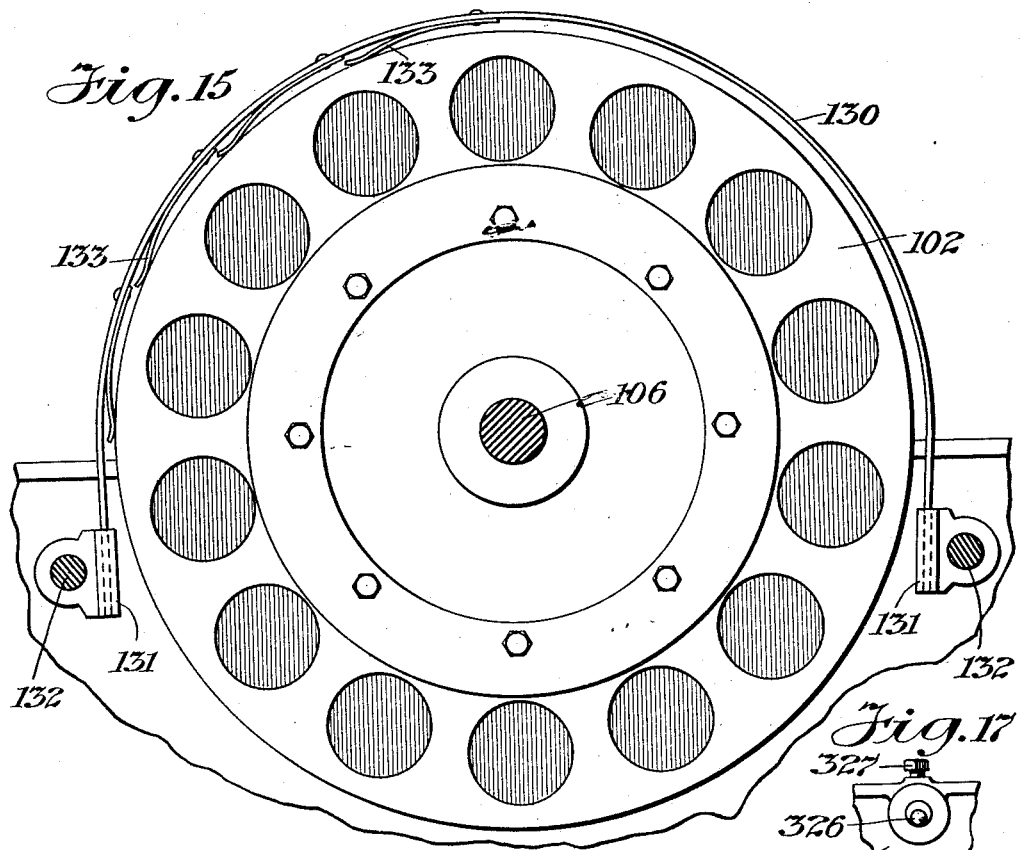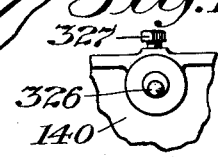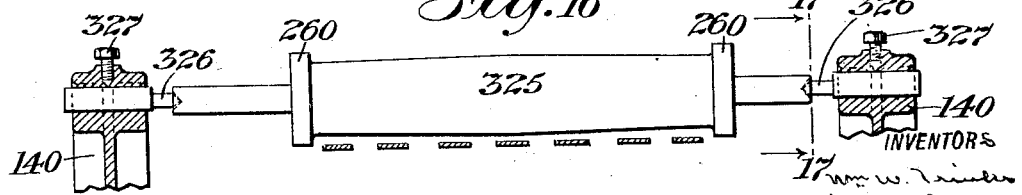

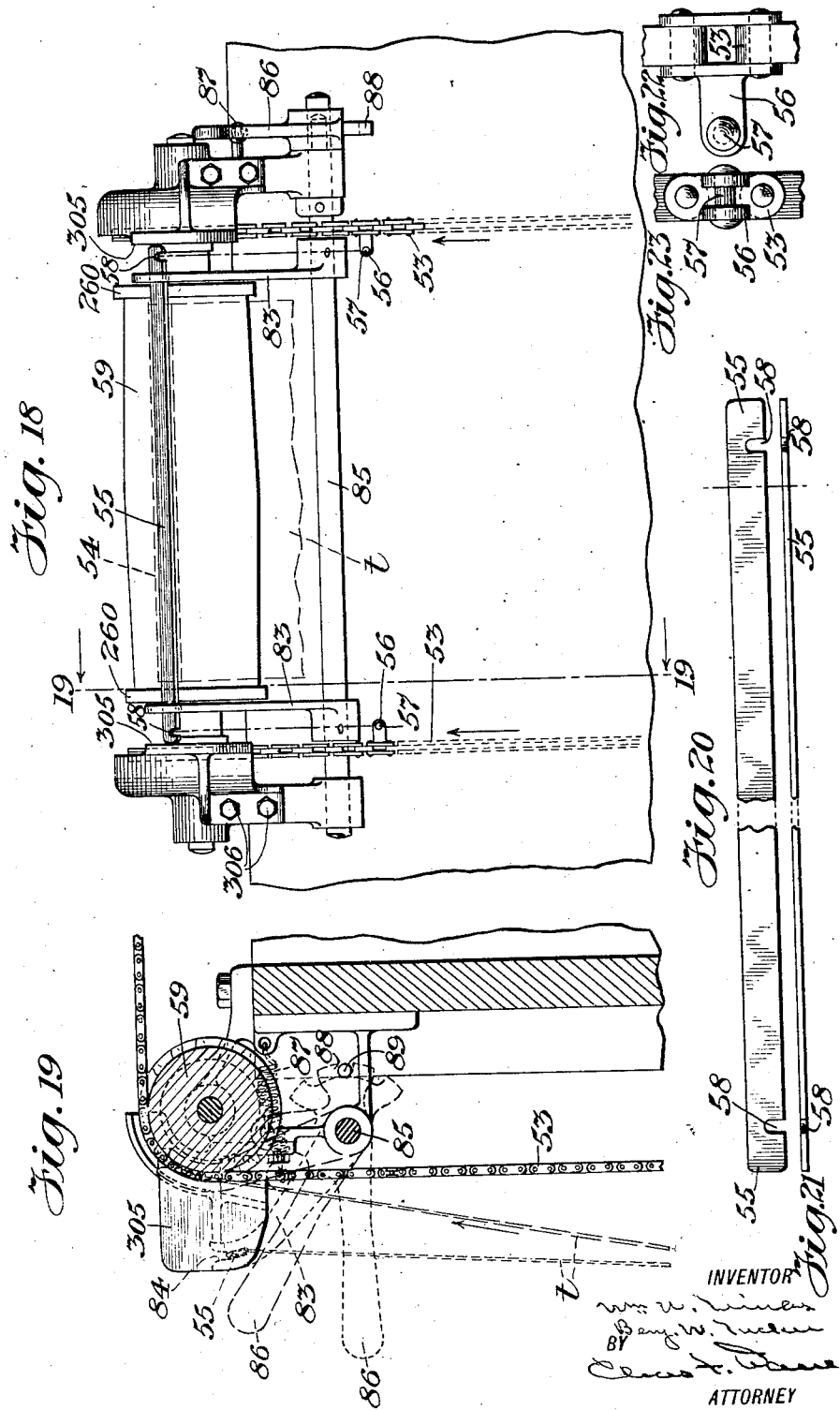

Patented Oct. 21, 1930

1,778,777

UNITED STATES PATENT OFFICE

WILLIAM W. TRINKS, OF BRIDGEPORT, CONNECTICUT, AND BENJAMIN W. TUCKER, OF SOUTH ORANGE, NEW JERSEY, ASSIGNORS TO PULLCLEAN MANUFACTURING CORPORATION, OF BRIDGEPORT, CONNECTICUT, A CORPORATION OF DELAWARE

LAUNDERING MACHINE

Application filed November 21, 1921. Serial No. 516,806.

This invention relates to laundering machines and has for its main object the provision of a simple and efficient machine for laundering towels, which, when in use, are wound up in roll form for use in a towel cabinet or otherwise.

In carrying the invention into effect we provide a machine which preferably comprises as its main elements, a washing means; a rinsing means; a mangle; a feeding means for unwinding a rolled towel supported in advance of the washing means and carrying the same through said washing, rinsing and mangling means to be operated upon by them in the order named; and a rewinding means for receiving the towel from the feeding means after having been passed through the mangle and automatically rewinding the same into roll form; this entire operation of unwinding, laundering, and rewinding the towel being automatically accomplished in one continuous operation.

While our invention is particularly adapted for the laundering of towels which are used in rolled form as stated, we do not wish to be understood as limiting the invention to any such particular use, as it will be understood from the drawings and description of the invention which follows that it may be used for general laundering purposes.

Referring now to the accompanying drawings illustrating one practical embodiment of our invention—

Figs. 1 and 2 represent a side elevation of that part of our improved machine comprising the washing, rinsing and wringing devices, together with the towel supporting reel at the front end of the machine and the feeding means for drawing or feeding the towels from said reel through the several laundering devices of the machine.

Fig. 3 is a side elevation of that part of the machine comprising the mangle and to which the towels are directly fed from the wringing device shown at the upper rear end of the tank in Fig. 2.

Figs. 5 and 6 are plan views of those parts of the machine shown in Figs. 1 and 2 respectively.

Fig. 7 is an end elevation of that part of the machine shown in Fig. 3, looking from the left-hand end thereof.

Figs. 8 and 9 are views similar to Fig. 4, but showing the changed positions of the parts at different times in the operation of the machine.

Fig. 10 is an enlarged sectional detail taken on the line 10—10 of Fig. 4.

Fig. 11 is an end elevation of the machine looking from the right in Fig. 4.

Fig. 12 is a diagrammatic view showing in side elevation the path of movement of the endless feed belts with respect to the washing and rinsing means and the mangle.

Fig. 13 is also a diagrammatic view showing in top plan the general outline of the framework of the machine and the main drive shaft at one side thereof for operating the several different mechanisms of the machine.

Fig. 14 is an enlarged detail, in side elevation and section, showing the rear drum of the mangle, the means for releasing the leading end of the towel from the feed chains and delivering it to the winding mechanism, and the intermediate guides for the feed chains and towel.

Fig. 15 is an enlarged detail showing one of the mangle drums in end elevation and one of the drum encircling bands with its spring fingers for holding the towel to the drum in its passage thereover.

Fig. 16 is an enlarged detail of a guide roll for engaging the towel in its passage to the winding mechanism, the same being mounted on eccentric bearings adjustably supported on the frame, which latter is shown in section on the line 16—16 of Fig. 8.

Fig. 17 is an end view of one of the eccentric bearings and its support as viewed from a point taken on the line 17—17 of Fig. 16.

Fig. 18 is an enlarged elevation of the upper front end of the machine at the point where the leading end of the towel is supported to be engaged by the feeding means and carried thereby through the machine.

Fig. 19 is a section taken on the line 19—19 of Fig. 18.

Figs. 20 and 21 are side and edge views respectively of a bar which is adapted to be entered through a loop in the leading end of the towel with its ends projecting at both sides of the latter for direct engagement by the feeding chains.

Figs. 22 and 23 are top and end views respectively of one of a pair of inwardly projecting arms on the opposite feeding chains for loosely engaging the projecting ends of the said bar in the towel loop.

Fig. 24 is an enlarged longitudinal section through one of the towel carrying spindles of the reel at the front of the machine, showing the means for braking the winding action of the towel thereon, and Figs. 25 and 26 are end views of said spindle and supporting reel arms as viewed from the right and left ends, respectively, of Fig. 24.

Similar reference characters indicate like parts in the several figures of the drawings.

Figure 27:
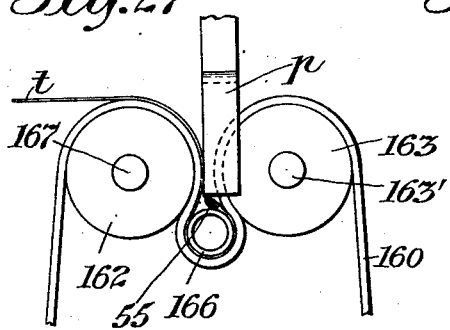
Fig. 27 is a detail showing the relation of certain parts of the rewinding mechanism.

The washing and rinsing means each preferably comprises a water-holding chamber and scrubbing brushes mounted therein. As here shown, these chambers are formed in a single tank 1 which is mounted on legs 2, this tank being provided about midway of its length with a wall 3 which divides the same into the said two chambers, the one at the front end of the tank, indicated at $w$, constituting the washing chamber, and the one at the rear end of the tank, indicated at $r$, constituting the rinsing chamber. Mounted within each of these chambers are two sets of rotary scrubbing brushes, the brushes of one set, indicated at 4, being arranged immediately above those of the other set, indicated at 5, whereby the brushes of each set will be directly opposed for cooperation in acting upon the opposite sides of a towel being drawn or fed therebetween.

Each of these brushes is mounted on a shaft 6 which is journalled at its opposite ends in journal boxes 7—7 slidably mounted in vertical guides 8—8 on the opposite inner walls of the tank chambers, the brushes of each set being vertically adjustable with respect to those of the other for the purpose of taking up wear of the brushes and keeping them in proper working relation. Any suitable means may be provided for effecting such adjustment of the brushes, the means here shown comprising a pair of adjusting screws 9—9 mounted in the head of each guide 8 with their threaded ends engaging the journal boxes of the adjacent pair of brushes, that is, one screw engaging the journal box of the upper brush and the other screw engaging the journal box of the lower brush.

The two sets of brushes are adapted to be operated in a manner whereby their adjacent opposed faces will move or rotate in opposite directions relatively to each other, this movement of the same obviously resulting in a more efficient scrubbing action on the interposed towel and at the same time neutralizing their effect on the feeding movements of the towel. Any suitable means may be employed for operating these brushes in the manner stated. As here shown the brushes in both the washing and rinsing tanks are operated by like connections from a main drive shaft 10 journalled in brackets 11 on one side of the tank 1. As the drive connections from the shaft 10 to the brushes in the rinsing chamber can be more readily followed than the connections from said shaft to the brushes in the washing chamber, on account of the break in the latter connections between Figs. 1 and 2 and Figs. 5 and 6, we will first refer to them. These connections, as most clearly shown in Figs. 2 and 6, comprise a shaft 12 which is journalled in suitable bearings on the opposite upper edges of the tank and operated from the drive shaft 10 through bevel gears 14. Fixed to this shaft 12 is a pinion 15 which meshes with and drives a large spur gear 16 fixed to a hollow shaft 17 mounted on a bearing rod 18, which latter is suitably supported at its ends in bracket plates 19—19 attached to the opposite inner walls of the tank. The gear 16 in turn meshes with and drives two pinions 20 and 21, the pinion 20 being in driving connection with the upper set of brushes and the pinion 21 being in driving connection with the lower set of brushes.

The pinion 20, as here shown, is fixed on the shaft 6 of the end brush of the upper set, and this shaft is in operative driving connection with the several other shafts of the same set through sprockets and connecting chains, 22 and 23 respectively, as clearly shown in Fig. 6, while the pinion 21 is fixed to a shaft 24 journalled in suitable bearings on the inner walls of the tank, which shaft adjacent its opposite or rear end is in operative driving connection with the several shafts of the lower set of brushes through sprockets and connecting chains, 25 and 26 respectively, also as clearly shown in Fig. 6. It will thus be clear that the two sets of brushes, driven from the gear 16 through the connections described, will be caused to rotate with their adjacent opposed faces moving in opposite directions relatively to each other for the purpose referred to.

As the two sets of brushes in the washing chamber are driven from the drive shaft 10 in the same manner as that just described in connection with the brushes of the rinsing chamber, and as the like means in both cases are indicated by like reference characters, the description just given for one will suffice for both.

In feeding the towel from the washing chamber to the rinsing chamber, it is desirable that the major part of the washing suds should be removed from the towel before the latter is brought into the rinsing water. To effect this we have mounted a wringer device on top of the tank through which the towel is drawn in its passage from one chamber to the other. This wringer may be of any suitable type, the one here shown comprising a pair of coacting rolls 30 and 31, the lower roll 30 being carried by a shaft 32 suitably journalled at its ends on the opposite upper edges of the tank, and the upper roll 31 being yieldingly held in operative relation to the lower one by spring arms 34—34 engaging its opposite ends, the pressure of the upper roll relatively to the lower one being regulated by adjusting nuts 35 located on upright threaded pins 36 and acting against coiled springs 37 surrounding the pins between said adjusting nuts and the ends of the spring arms 34, as clearly shown in Fig. 2. To facilitate the feed of the towel through this wringer, the lower roll of the same is positively driven by the pinion 15 of the brush drive acting through a meshing gear 38 fixed to the roll shaft 32 as shown in Figs. 2 and 6, and the upper roll is in turn driven from the lower one by a gear connection 39 in usual manner.

After the towel leaves the rinsing tank in its passage through the machine, the washing operation has been completed. It is therefore desirable that it should be wrung out as thoroughly as possible before reaching the mangle in order to facilitate the action of the latter in drying and smoothing the towel. For such reason we provide a plurality of wringers, here shown as three in number, for acting on the towel in its passage from the rinsing tank to the mangle, instead of only one as between the washing and rinsing chambers. Each of the wringers of this second set is identical in construction and operation with the one just described and the like parts are indicated by like reference numerals, therefore, a further detailed description of the same will be unnecessary. In this second set of wringers, the first one of the set is driven from the pinion 15 of the rinsing brush drive, like that of the first described wringer driven from the pinion 15 of the washing brush drive, but the second and third wringers of this set are driven from the shaft 10 through bevel gears 41 and 42, the latter being fixed to the end of a shaft 43 journaled on the opposite upper edges of the tank and provided with a gear 44 meshing with two larger gears 45 and 46 fixed to the shafts of the second and third wringers as shown. It will of course be understood in this connection that the number of wringers used may be varied more or less to meet the requirements of the particular work being done without in any way departing from the invention.

Before describing the mangle to which the towel is fed from the rinsing chamber, we will next describe the means for feeding or carrying the towel through the washing and rinsing chambers between the opposing sets of brushes mounted therein. As hereinbefore referred to, the towels to be laundered are preferably in roll form, the same being wound about a hollow tube or mandrel. This permits of the towels being conveniently mounted for rotation on a suitable support in front of the tank 1 and being gradually unwound therefrom as their front or leading ends are advanced through the machine. In the present instance we provide a reel 50 for carrying a plurality of towels, which is mounted on a shaft 51 journalled at its opposite ends in standards 52—52 secured in stationary position on the floor or other support. The reel is here shown as provided with a plurality of spindles 300 which are adapted to be passed through the tubes on which the towels are wound for the purpose of rotatably mounting the towels on the reel. In order to permit of the convenient placing of the towels on these spindles and their ready removal therefrom, we preferably hinge the spindles at one end, as at 301 in Figs. 24 and 25, and provide a spring socket on the reel for yieldingly holding the opposite or free end of the spindle, as shown at 302 in Figs. 24 and 26. With this construction we simply raise the free end of the spindle from the spring socket 302, slip the tube at the center of the rolled towel on or off the spindle as the case may be, and then return the spindle to its normal position by snapping the end of the same into its holding socket as shown.

From the reel 50, the free end of the towel nearest the tank is led to a position at the upper front end of the tank to be engaged by the towel carrying or feeding means, which latter as here shown comprises a pair of endless sprocket chains or belts 53—53 which are spaced apart a distance slightly greater than the width of the towel and mounted on a series of suitably supported sprocket wheels, some of which serve as guides and others of which serve as drive wheels, these latter being actuated through suitable gearing from the main drive shaft 10. The general path of these sprocket chains, which are indicated diagrammatically by a broken line, is clearly illustrated in Fig. 12, where they are shown as first passing into and through the washing chamber, from thence into and through the rinsing chamber, and from the latter to and about the several drying and smoothing drums of the mangle.

Any suitable means may be employed for effecting detachable connection of the towel t with the feeding chains to be drawn by the latter through the machine. In the present case we provide one end of the towel with a loop 54 through which is passed a flat bar 55 with its ends projecting slightly beyond the opposite edges of the towel for connection with the feed chains, these latter preferably being provided at predetermined points with inwardly projecting forked arms 56 having pins 57 for engaging the projecting ends of the towel bar within notches 58 therein (see Figs. 18-23).

When the end of a towel is thus connected with the continuously moving feed chains at the upper front end of the tank, it is drawn by them over the guide rolls 59 and 60 to a point above the washing chamber, thence downwardly into the chamber and beneath a guide roll 61, from which it is advanced between the opposed upper and lower sets of rotating brushes to a point adjacent the rear end of the chamber, where it is carried about a guide roll 62 and from thence upwardly and about a guide roll 63 to the first wringer 30—31. From the latter the towel continues in its feeding movement about rolls 64 and 65 until it reaches the opposed sets of brushes in the second or rinsing chamber, between which it is advanced to a point adjacent the rear end of the chamber, where it is carried about a guide roll 66 and from thence upwardly and about a guide roll 67 to the second set of wringers, through which latter it is drawn to the mangle.

The several pairs of feed-chain driving sprocket wheels which are mounted on the washing tank are indicated at 70—70, 71—71, 72—72 and 73—73, the wheels 70—70 being mounted on a shaft 74 which is journalled on the upper edge of the tank and driven from the shaft 10 through the bevel gearing 75, the wheels 71—71 being mounted on the shaft 12 at the rear upper end of the washing tank which is driven from the shaft 10 through the bevel gearing 14, the wheels 72—72 being mounted on a shaft 76 which is journalled on the upper edge of the tank and driven from the shaft 10 through the bevel gearing 77, and the wheels 73—73 being mounted on the shaft 12 at the rear upper end of the rinsing tank which is driven from the shaft 10 through the adjacent bevel gearing 14. The several other sprocket wheels mounted on the tank and on the supporting legs thereof, indicated at 78, about which the chains pass, are merely guides which cooperate with the driving sprockets for directing the movement of the chains in their proper paths.

In carrying or feeding the towels through the washing and rinsing chambers, it is desirable that the same should be moved in a substantially straight path between the opposed upper and lower sets of brushes therein. To effect this, a pair of supporting plates 80—80 are arranged lengthwise of each chamber of the tank beneath the horizontal run of the opposite chains therein, on which the chains loosely rest and slide while drawing the towels between the brushes, these chain supporting plates being supported on cross bars 81—81 which are attached at their ends to the opposite walls of the tank, as by screws 82—82, as clearly shown in Figs. 5 and 6.

In order that the towel carrying attachment or bar 55 may be automatically engaged by the arms 56 of the feed chains during the feeding movement of the latter, we have mounted on the upper front end of the tank 1 a holder attachment for said bar, comprising a pair of arms 83—83 having notches 84—84 in which the bar 55 may be loosely seated with its ends projecting into the path of movement of said arms 56 on the feed chains to be engaged by them, as shown in Fig. 18. These holder arms 83—83 are here shown as fixed on a rock shaft 85 having at one end thereof a lever handle 86 by which the rock shaft may be operated to swing the holder arms outwardly from the feed chains, as shown by dotted lines in Fig. 19, to permit of the more convenient placing of the towel bar in the notches of said arms. A spring 87, connecting at one end with said lever handle and at its opposite end with a fixed part of the machine, acts to yieldingly hold the arms 83 in a normally closed position for supporting the bar 55 in position to be engaged by the feed chain arms 56, this closed position of the bar holder being determined by the engagement of an extension 88 of the lever handle with a fixed part 89 on the machine, as shown in Figs. 1 and 19.

With this holder for the towel bar 55, it will be understood that after one bar has been engaged by the feed chains and started on its travel through the machine, the bar in the end loop of the next towel on the reel may then be placed in the notches of the holder arms ready to be automatically engaged at the proper predetermined time by the next set of bar engaging arms on the feed chains, these arms being so placed as to carry the successive towels through the machine without interfering one with the other.

In order that the towel bars 55, when placed in the notches of the holder arms 83—83, will be properly positioned and held with their notches 58 in the path of the feed engaging members 56, as shown in Fig. 18 wherein broken lines between said members and the notches of the towel bar indicate the paths of said members, we have provided fixed gage-plates 305—305, between which the towel bars are loosely held against endwise movement as shown in said Fig. 18, preliminary to their engagement by the feed members. These gage-plates are secured to bracket arms at the opposite sides of the machine by suitable fastening means, such as the screws or bolts 306, and are preferably made of sufficient size to engage the ends of the towel bars in any position of the holding arms 83, that is, when said arms are swung backwardly to receiving position as shown by dotted lines in Fig. 19, as well as when they are in their normal closed position as in Fig. 18.

The towel carrying reel 50 is held against backward rotation under the pull of the towel in being drawn therefrom, by means of a pawl 90 pivoted on one of the reel supporting standards at 91 and engaging ratchet teeth or shoulders 92 on the reel shaft 51, as clearly shown in Fig. 1.

In order that the towels may be maintained under tension as they are drawn from the reel, a braking means for retarding the unwinding of the same is employed. This means, as shown in Fig. 24, comprises a plate 93 seated within a longitudinal opening in each of the towel carrying spindles 300 and yieldingly held by springs 94 in a normal position projecting beyond the peripheral surface of the spindle for braking engagement with the inner wall of the hollow tube about which the towel is wound. This construction provides a braking surface of considerable area and has been found to be most effective for the purpose.

We will next describe the mangle to which the towel is fed from the rinsing tank. This comprises a plurality of heated drums, here shown as four in number, about which the towel passes for the purpose of being smoothed and dried in the usual manner. These drums, indicated at 100, 101, 102 and 103, are mounted on shafts 104, 105, 106 and 107 respectively, which are journalled in suitable bearings on a frame 108, as best shown in Figs. 3 and 7, the said frame 108 being fastened on the floor or other support in line with the washing tank 1 and having on one side thereof bearing brackets 109 in which the driving shaft 10, in its continuation from the washing tank, is journalled.

Mounted on the several drum carrying shafts are sprocket wheels 110 about which the feed chains 53 pass in carrying the towels around the drums, these sprocket wheels being of substantially the same diameter as that of the drums in order that the leading end of the towels carried by the feed chains may be held in contact with the drums. The shafts carrying these drums and sprocket wheels are positively rotated from the driving shaft 10 through the following means: Two cross shafts, 111 and 112, driven from the shaft 10 through bevel gearing 113 and 114 respectively, are provided with pinions 115 and 116 (Figs. 3 and 7) meshing with large gears 117 and 118, respectively, on the two upper drum shafts, while these gears 117 and 118 in turn mesh with gears 119 and 120 respectively, on the two lower drum shafts. In this way it will be understood that the several drums of the mangle and the towel feeding chains will be positively driven in unison.

Encircling the major part of the circumference of each of the mangle drums are a plurality of bands 130 which are held at their opposite ends in sleeves 131 mounted on rods 132 carried by the supporting frame. These bands may be employed alone for the purpose of holding the towels in contact with the heated drums during their passage thereover. We have found in practice however, that more effective results may be obtained, that is, a quicker drying of the towels effected, by providing each of these bands on its inner side with a plurality of inwardly projecting fingers 133 which will act to hold the towels in close contact with the drums while passing thereover. A further and important function of these towel holding fingers is that of preventing the rear ends of the towels from dropping down when reaching a position where they commence their downward movement at the rear side of the upper drums. Without these fingers or equivalent holding means, the free or loose rear end of the towels, when brought to such position, would have a tendency to drop down and fold on itself, thus preventing the rear end of the towel from continuing through the machine in a smooth and unwrinkled condition as it is desirable to have it do.

After the towel leaves the rinsing chamber and the wringers mounted at the rear end thereof, it is liable to be in a somewhat wrinkled condition, and as it is desirable that it should pass onto the mangle drums in a smooth and unwrinkled condition in order to be properly acted on by the latter, we have located means between the washing tank and the mangle which is operative on the towel at such point to spread out and smooth the same. This spreading and smoothing means as here shown comprises a roll 135 mounted on the shaft 111 for rotation therewith and having two spiral ribs 136—136 thereon which diverge in opposite directions from the center of the roll towards the ends thereof. As the towel is led around this spreader roll 135 in its passage to the first mangle drum 100, as shown in Fig. 3, it will be understood that the spiral ribs on the roll will act to spread the towel laterally from the center thereof and so smooth the same preliminary to its passing through the mangle.

For the proper functioning of this ribbed roll 135, it is desirable that the towel should be held under some tension when passing about the same. This we obtain by locating a tension roller 137 in advance of the spreader roll 135, as shown in Figs. 3 and 7, which is operative to engage the towel at its under side and hold it under tension as it passes onto the spreader roll. Such action of the tension roller is obtained by mounting the same at one end of a pivoted frame 138, which latter at its opposite or rear end carries a weight 139. It is obvious that by varying this weight any desired tension on the towel may be secured.

The towel, after leaving the mangle, next passes to the rewinding mechanism which is carried by a frame 140 located in line with the mangle frame 108 and preferably secured to the floor or other support so as to be in fixed relation with the preceding units of the machine. Secured on one side of this frame is a bearing bracket 141 similar to the brackets 109 on the mangle frame and in which the rear end of the drive shaft 10 is journalled as shown, this drive shaft 10 extending substantially the full length of the machine and being adapted to be driven from any suitable source of power, as for instance, by a drive belt (not shown) engaging a pulley 142 thereon (see Fig. 13).

The feed chains 53—53, after carrying the towel about the rear mangle drum 103, next pass about a pair of guide sprocket wheels 143 on the mangle frame, and from thence about several pairs of sprocket wheels on the rewinder frame 140, indicated at 145, 146, 147, 148 and 149, the latter being adjacent the lower part of the frame and from which the chains pass back on their return movement towards the front of the machine over the lower series of guide wheels 78. Of these lower sprocket wheels on the rewinder frame, all are guides with the exception of those indicated at 147. These latter are mounted on a shaft 150 which is driven from the shaft 10 through bevel gearing 151. As a means for keeping the chains under proper tension, the lower guide wheels 149 are each mounted on a block 152 which is slidably mounted on fixed rods 153—153 carried by the frame 140, and connected with one end of an adjusting rod 154, which is threaded into a fixed plate 155. By turning these adjusting rods to shift the wheel supporting blocks 152 either backward or forward, the operator is thereby enabled to control the slack in the chains and keep the latter under proper working tension.

The tower rewinder as here shown comprises a plurality of endless belts 160 which are mounted on a series of pulleys, such as indicated at 161, 162, 163, 164 and 165, certain of which are adjustable relatively to the others to permit of the upper run of belt between the pulleys 162 and 163 being placed in loop form whereby to provide a pocket to receive and hold a hollow tube or mandrel 166 about which the towel is to be wound, the winding operation being performed by the running of the belts which act through frictional engagement with the tube or mandrel to revolve the same and thereby effect a winding of the towel thereon as the leading end of the towel is fed to said tube in the loop of the winding belts. The winding belts are operated to run continuously, the same being driven from the pulleys 162 which are fixed to a shaft 167 driven from the shaft 150 through gears 168 and 169.

Figure 4:
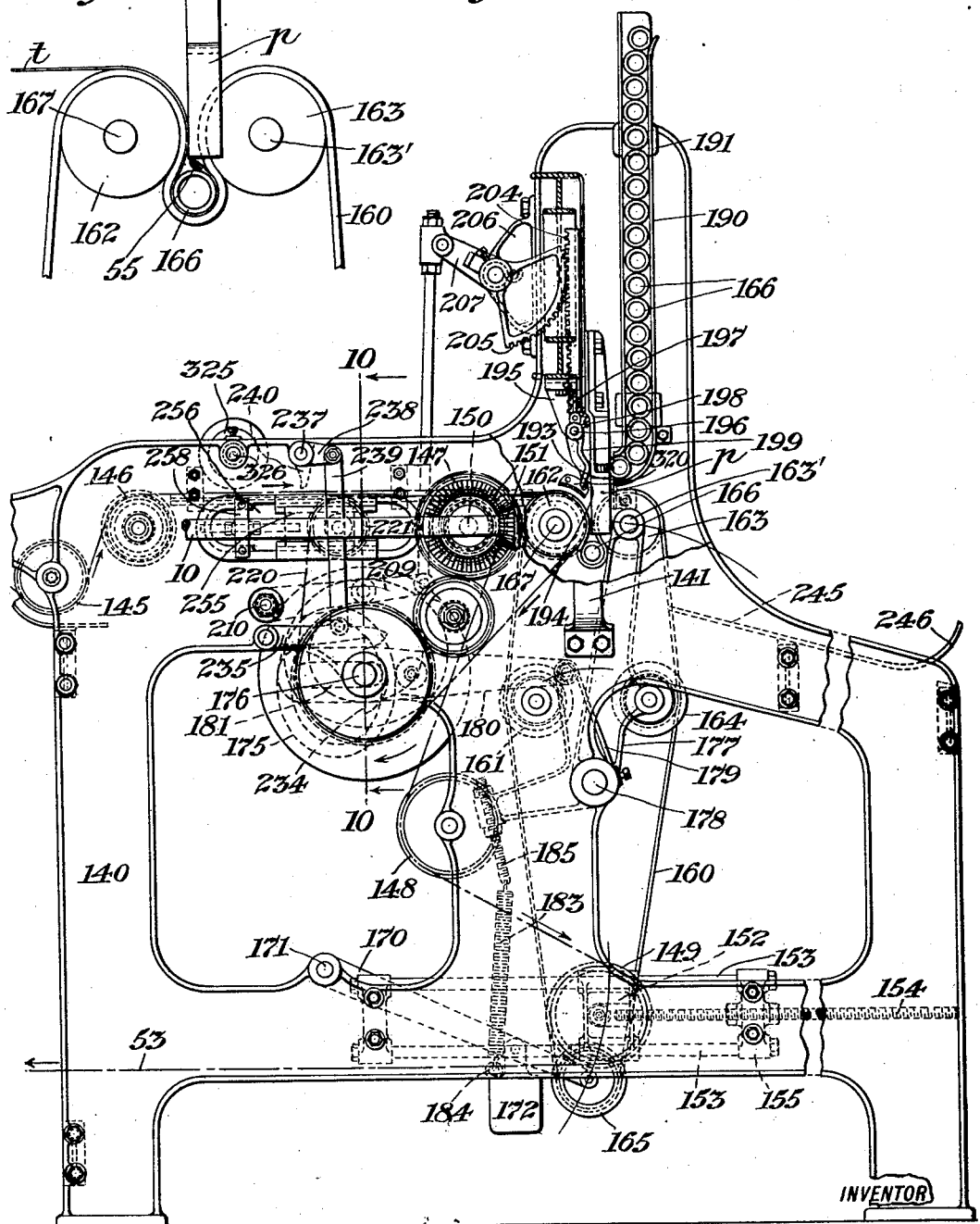
Fig. 4 is a side elevation of that part of the machine beyond the mangle comprising the winding mechanism and to which the towels are fed from the mangle.

The tube holding loop or pocket in the upper run of the belts is formed at a predetermined time in the operation of the machine, to wit, just prior to the leading end of the towel reaching the belts, by the action of a plunger p which releases a tube from its containing magazine to permit it to drop onto the upper run of belts, and then, by a continued downward movement against the tube, depresses both said tube and the upper run of belts downwardly between the adjacent sets of pulleys 162 and 163, as shown in Fig. 4. When the tube is thus pressed downward by the plunger p against the upper run of belts to form a loop therein, the pulley 163 is at the same time moved forward towards the adjacent pulley 162, as from the position shown in Fig. 9 to that shown in Fig. 4, in order to cause the belts to closely embrace the tube and thereby more effectively assure the winding of the towel thereon. As the winding operation proceeds following the entry of the leading end of the towel into the winding loop and about the tube therein, the diameter of the roller towel of course gradually increases, as shown in Fig. 8, thereby making it necessary that the size of the winding loop should correspondingly increase. To provide for such increase in the size of the winding loop by automatically acting means, the shaft of the pulley 165 is mounted on a plurality of lever arms 170 which are pivoted to the frame at 171 and provided with attached weights 172. Such movable support for the pulley 165 automatically permits of any necessary variation in the length of the belt loop while at the same time it maintains the belt under constant tension.

During the winding operation and until the completion of the same, the rollers 163 and plunger p maintain the positions shown in Fig. 4, that is, the rollers remain in their forward position adjacent the rollers 162 to close the mouth of the winding loop and the plunger remains in its lowered position opposite said mouth of the loop; in this way serving to hold the towel in the winding loop of the belts during the winding operation. After the winding operation has been completed the rollers 163 are automatically thrown back and the plunger raised, through the positions shown in Fig. 8 to those shown in Fig. 9, to release the rolled up towel and permit its discharge from the machine. Such operations of the rollers 163 and plunger p are automatically controlled from an intermittently operated clutch controlled shaft 176 in a manner to be presently described.

The lower or tube-engaging end of the plunger p is composed of a plurality of fingers, as shown by dotted lines in Fig. 11, which are so spaced as to permit of their entry between the several rollers 163 on the shaft 163' when the parts are in the position shown in Fig. 4. One of the functions of the plunger $p$ when in this lowered position, is to assure the towel bar 55 taking one complete turn about the tube in the winding belt at the commencement of the towel winding operation; this being accomplised by the engagement of the plunger with the leading edge of the towel bar when the latter reaches the mouth of the belt loop during its first turn about the tube, as shown in Fig. 27, and thereby holding the bar against the tube at such time and until it has passed beneath the second wrap of the towel about the tube and is held thereby. Without this holding of the bar against the tube at such time, it would have a tendency to move up into the mouth of the winding belt loop and so prevent or interfere with the proper winding of the towel.

The shifting of the pulleys 163 towards and from the pulleys 162 in the manner and for the purpose described is controlled from a cam 175 on the shaft 176 through the following means: the shaft 163' carrying the pulleys 163 is mounted in a pair of arms 177—177 fixed to a rock shaft 178 journalled in the frame 140. Secured to this rock-shaft 178 is a bell-crank lever 179, to the vertical arm of which is connected one end of a link 180, which latter at its opposite end has a sliding support on the shaft 176, this being effected by the provision of an elongated slot 181 in the link through which the shaft 176 extends. A roller 182 mounted on this link is held in operative engagement with the peripheral working face of the cam 175 by means of a spring 183 connecting the horizontal arm of the bell-crank 179 with a fixed part, such as the eye-piece 184 on the frame. With this arrangement and combination of parts, a rotating movement of the cam 175 will act, through the link 180 and connected rocking parts 179, 178 and 177, to positively move the pulleys 163 from their inner or closed position shown in Fig. 4, towards their outer or open position, as shown in Figs. 8 and 9, and thereafter control their return movement under the action of the spring 183. For the purpose of keeping the spring 183 under proper tension, its connection with the bell-crank is made through an adjusting screw 185 as shown.

The hollow tubes 166 about which the towels are wound are contained in a vertically arranged magazine 190 secured to the supporting frame 140 by suitable fastening means, such as the attaching brackets 191 and fastening screws 192. This magazine is provided at its lower end with a lateral opening 193 through which the tubes automatically discharge by gravity in a position directly above the upper run of the winding belts, as shown. A retainer 194 is provided for normally holding the lowermost tube in a position partially projecting from the discharge opening 193 and in the path of the plunger $p$, as shown in Fig. 9. This retainer as here shown is pivoted to a fixed supporting bracket 195 at 196 and is yieldingly held in its said normal tube retaining position by a spring 197 connecting at one end with a pin 198 on the retainer and at its opposite end with a fixed part of the frame. The plunger $p$, when operated on its down stroke from the position shown in Fig. 9, first engages an inclined or cam surface 199 on the retainer and forces the latter laterally from its tube retaining position to thereby release the engaged tube and permit the same to drop on to the winding belts, the released tube being held on the inclined belts beneath the plunger by downwardly projecting fingers 200 at the lower end of the rear wall of the magazine. After the plunger has thus shifted the retainer to release the tube, it follows the tube and forces the same downward to depress the belts and form a winding loop therein as hereinbefore described. While the plunger is in its lowered position it closes the discharge opening in the magazine, as shown in Figs. 4 and 8, but when it passes said opening on its return upward movement, it will release the retainer and thereby permit the latter to move to its normal retaining position under the action of the spring 197.

The plunger $p$ may be operated by any suitable means. As here shown it is attached to the rear side of a plate or block 201 suitably mounted for vertical movement in a slot or way 202 in a fixed plate 203 carried by the machine frame. Attached to the front side of this plate or block 201 is a rack-bar 204 which is engaged by an operating segment gear 205 pivoted to a supporting bracket 206 and having a rear arm 207 connecting through a link 208 with the free end of a lever 209, which latter is pivoted to the frame at 210 and provided with an attached roller 211 engaged by a grooved cam 212 on the intermittently operated shaft 176. Rotation of this grooved cam, acting through the connections 209 and 208, serves to oscillate the segment gear 205 about its axis on the supporting bracket 206 and so impart a vertical movement to the rack-bar 204 and connected plunger $p$. The timing of the action of this plunger in releasing a tube from the magazine and depressing the upper run of belts to form a winding loop therein, and also the timing of the forward and backward movement of the belt rolls 163 in the closing and opening of said winding loop, all as controlled from the shaft 176, will be hereinafter more particularly referred to.

After the leading end of the towel has been brought to the rewinding mechanism by the carrier or feed chains, the towel bar is adapted to be released from said chains and delivered into the loop of the winding belts to be wound about the tube therein. This is effected by a pair of endless sprocket chains 220—220 mounted on pairs of sprocket wheels 221, 222 and 223, the first two pairs being merely guide wheels and the last pair, those indicated at 223, being driving wheels and mounted on the intermittently operated shaft 176, as most clearly shown in Figs. 10 and 14. These releasing chains, which are operated to move at a greater speed than that of the feed chains, are provided with projections 224 which are moved in paths to engage the ends of the towel bar 55 adjacent the rear end of the upper runs of the feed chains and disengage said bar from the latter and deliver it into the loop of the winding belts. Such delivery of the towel bar into the loop of the winding belts is effected by loosely mounting the rear guide wheels 222 on the shaft 167 which carries the belt pulleys 162, whereby the towel bar engaging projections 224 on the releasing chains will carry the towel bar into the belt loop formed at the rear side of said pulleys 162, and there drop or release the same upon their movement in a reverse direction towards the driving wheels 223, as will be clear by reference to Figs. 4, 8 and 14. A pair of fixed guides 320 attached to the opposite side frames in position to overhang the ends of the towel bar at the point where the latter is carried downwardly at the rear side of the guide wheels 222, serve to prevent disengagement of the towel bar from the lugs 224 of the releasing chains at such point.

As it is only necessary to operate certain parts of the rewinding mechanism when the leading end of the towel is brought adjacent thereto, viz: the plunger $p$, the swinging support 177 for the rear winding belt pulleys 163, and the towel-bar releasing and delivery chains 220, the shaft 176 for operating such parts is connected with its driver through a clutch which is adapted to be automatically controlled from the towel feeding chains 53. The driver for the shaft 176 is here shown as a gear wheel 230 loosely mounted on the end of said shaft and being continuously driven from the shaft 150 through gearing 231 and 232 (see Figs. 4, 8, 9 and 11). Any usual or suitable form of clutch may be employed for connecting the shaft with this driver. The clutch here employed (not shown) is controlled from a disc 233 loosely mounted on the shaft and carrying a projection 234 which is normally engaged by a pivoted latch 235 to maintain the clutch in unclutched relation to the driver. Upon releasing the latch 235 from the projection 234, the disc 233 will be free to throw in the clutch and automatically connect the shaft to the driver in the usual manner. To effect such throwing in of the clutch at the proper predetermined time in the operation of the machine, that is, when the leading end of the towel has been brought by the carrier or feed chains to a point adjacent the rewinding mechanism, we mount a shaft 237 on the frame in a position just above the feed chains and provide the same at one end with a horizontal arm 238 having connection with the latch 235 through a link 239, and also provide the same with two depending trip fingers 240—240 arranged with their lower ends projecting into the path of movement of the towel-bar 55 (see Fig. 10) to be engaged thereby and operated to rock the shaft 237 and so effect a lifting of the latch from engagement with the clutch controlling disc, as indicated by dotted lines in Fig. 8. When the disc is thus released from the latch and the clutch thrown into driving engagement, the shaft 176 with its attached operating parts are thrown into operation to actuate the rewinding mechanism in the manner hereinbefore referred to. This, briefly stated, is as follows: the plunger $p$, through the action of the cam 212 and intermediate driving connections, operates to effect a release of one of the tubes 166 from its containing magazine and to then force such tube downwardly upon the upper run of winding belts and form a winding loop therein, as shown in Fig. 4. At the same time the swinging support 177 for the rear winding belt pulleys 163, through the action of the cam 175 and spring 183, is operated to move the pulleys 163 forward from the position shown in Fig. 9 to that shown in Fig. 4 to partially close the upper end or mouth of the winding loop and cooperate with the front pulleys 162 and plunger $p$ in retaining the tube within said loop. While the loop is thus being formed in the winding belts and a tube placed therein, the releasing chains 220 have also been brought into operation by the shaft 176 and caused to release the towel-bar from its feed chains and deliver the same into the loop of the winding belts. The winding of the towel now begins and this operation continues until the towel has been completely wound about the tube, at which time or shortly thereafter the bar in the end of the succeeding towel is brought to a position to engage and actuate the clutch trip 240, whereupon the shaft 176 is again brought into action to operate the several parts of the winder mechanism through the positions shown in Figs. 8 and 9 and back again to those shown in Fig. 4, that is, the rear belt rollers 163 are thrown back to release the rolled up towel and cause its discharge from the winding loop and then brought forward again, the plunger $p$ is raised to permit of the discharge of another tube from its containing magazine and then lowered to force the discharged tube downward onto the upper run of the belts and press the latter into loop form between the adjacent sets of pulleys 162 and 163, and the releasing chains 220 are operated to release the bar in the leading end ing belts. When the wound towel is discharged from the loop of the winding belts by the straightening out of said loop to present a rearwardly sloping inclined run of belt as shown in Fig. 9, it drops onto a set of guide fingers or plates 245 which extend to the rear of the machine where they are provided with upturned retaining ends 246 as shown in Fig. 4.

Following the raising of the latch 235 by the trip fingers 240 to effect a throwing in of the clutch mechanism, said latch drops back to latching position to be operative to throw out the clutch after one complete rotation of the shaft 176.

As hereinbefore referred to, the towel-bar releasing or transfer chains 220 are geared to operate at a greater speed than that of the feed chains in order to release the towel-bar from the latter by a movement in the direction of movement of the feed chains. To do this, it obviously requires a certain amount of slack in the towel adjacent the point where it is taken by the releasing chains from the feed chains. Such slack is provided by deflecting the feed chains downwardly beneath the guide wheels 145 in their passage from the guide wheels 143 to the guide wheels 146, as shown in Fig. 14. To control such slack in the towel and maintain the same under proper tension, we provide a roll 250 for engaging the towel at such point, which is movably supported in order to yield and give off slack when the towel-bar is advanced from its connection with the feed chains by the engagement therewith of the more rapidly moving releasing chains, as hereinbefore described. This slack controlling roll 250 is here shown as carried by a pivoted frame 251 attached to the supporting frame at 252.

As a means for maintaining the releasing chains 220 under proper tension, the shaft carrying the supporting and guide rolls 221 is journalled in bearing blocks 255 which are slidably mounted in elongated slots 256 in the frame 140 and engaged by threaded adjusting rods 257 carried in fixed brackets 258, as most clearly shown in Figs. 4, 10 and 14.

Most of the guide rolls over which the towels are led in their passage through the machine are centrally coned, that is, made of greatest diameter at the center and gradually reduced in diameter towards their opposite ends, as shown for example in Figs. 16 and 18, for the purpose of holding the towel centrally of its path of movement through the machine and at the same time maintaining it in spread condition. As a further aid in holding the towel to its proper path of movement, the said guide rolls are also preferably formed with end guide flanges 260.

In the winding of the towel about the tubes it is desirable that they be wound evenly. To effect this, it is necessary that they be fed in a straight line into the winding mechanism. To do this we provide a guide roll 325 for engaging the towel just in advance of its passage into the winder mechanism, and mount the same on adjustable eccentric bearings 326 which are supported in the winder frame 140 and secured in adjusted position by fastening screws 327, as most clearly shown in Figs. 16 and 17. In the event of lateral reflection of the towel from its central path of movement, a slight raising or lowering of one or the other of the ends of this guide roll 325 through an adjustment of its bearings will correct such deflection and restore the feed of the towel to its normal central path.

As a further means for obtaining an even winding of the towels, we provide a pair of gage-plates 330—330 for engaging the ends of the towel bar 55 during the towel winding operation and preventing endwise movement of the same and thereby the associated tube 166 on which the towel is being wound, in the loop of the winding belts. These gage-plates 330 may be supported in any suitable way, the same as here shown being attached to the swinging arms 177 which carry the rear belt pulleys 163.

What we claim is:—

1. In a machine of the class described, the combination with washing means, of a carrier for carrying a connected towel through said washing means, a rotatable support located in advance of the washing means for holding a plurality of roller towels, a bar for connection with the end of one of said rolled towels, means for supporting said bar in position to be engaged by said carrier and drawn through the machine, and means holding the rotatable towel support against rotation during the unwinding of a rolled towel thereon by the action of the towel carrier.

2. In a machine of the class described, the combination of laundering means comprising successively arranged washing, wringing and drying devices, means for rotatably supporting a rolled towel in advance of the washing device, a bar for connection with one end of the towel, a support for loosely holding said bar in the path of a towel carrier, an automatic rewinder at the rear of the device, and an endless carrier operative to engage said bar on its support and carry the same with the connected towel through the successively arranged laundering devices and deliver it to the automatic rewinder at the rear end of the machine.

3. In a machine of the class described, the combination of successively arranged washing and drying means, means for supporting a rolled towel in advance of said washing means, a towel rewinding means at the rear of the drying means, a bar connected with one end of said towel with its ends in position adjacent the opposite edges of the towel, a carrier operative to engage said bar and draw the connected towel through the washing and drying means and deliver it to the rewinding means, and engage-plates loosely engaging the opposite ends of the towel bar during the rewinding operation and holding the same against endwise movement.

4. In a machine of the class described, the combination with washing means, of a carrier for carrying a connected towel through said washing means, a rotatable support located in advance of the washing means for holding a plurality of rolled towels, means detachably connected to one end of a towel on said support, and means for supporting the detachable means in position to be engaged with the towel carrier and drawn through the machine.

5. In a machine of the class described, the combination with washing means, of a carrier for carrying a connected towel through said washing means, a rotatable support located in advance of the washing means for holding a plurality of rolled towels, a bar for connection with the end of one of said rolled towels, and means for supporting said bar in position to be engaged by said carrier and drawn through the machine.

6. In a machine of the class described, the combination of a frame, washing means carried thereby, means for detachably supporting the end of a rolled towel on said frame in advance of said washing means, a carrier having means for engaging the detachable means and drawing the same with the towel through the washing means, and automatic means for rewinding the washed towel.

7. In a machine of the class described, the combination of a frame, successively arranged washing and drying means carried thereby, means for detachably supporting the end of a rolled towel on said frame in advance of said washing machine means, a towel rewinding means at the rear of the drying means, a carrier having means operative to engage the detachable means and draw the towel through the washing and drying means and deliver it to the rewinding means.

8. In machine of the class described, the combination of a frame, laundering means comprising successively arranged washing, wringing and drying devices carried thereby, means for rotatably supporting a roll of toweling adjacent said frame, means for detachably supporting the end of the towel on the frame in advance of the washing device, an automatic towel rewinder at the rear of the drying device, and a carrier operative to engage the means supporting the end of the towel to draw the towel through the successively arranged means and deliver it to the rewinder at the rear of the machine.

9. In a machine of the class described, the combination of a frame, washing means carried thereby, a bar for detachable connection with a towel, means for loosely supporting said bar on the frame in a position in advance of the washing means, a carrier comprising a pair of belts having bar engaging means and being operative in a path to engage the ends of said bar and draw the connected towel through the washing means, and automatic rewinder at the rear of the carrier, and means for transferring the bar carrying end of the towel to the rewinder.

Signed at New York, in the county of New York and State of New York, this 29th day of October, 1921.

WILLIAM W. TRINKS.
BENJAMIN W. TUCKER.